W. A. CHAPMAN

GREASE GUN

Feb. 17, 1931.

Re. 17,974

Original Filed Sept. 1, 1928

W. A. Chapman
Inventor

By C. A. Snow & Co.
Attorneys.

Reissued Feb. 17, 1931

Re. 17,974

UNITED STATES PATENT OFFICE

WILLIAM ARCHIE CHAPMAN, OF LITHONIA, GEORGIA, ASSIGNOR TO THE ARO EQUIPMENT CORPORATION, OF BRYAN, OHIO

GREASE GUN

Original No. 1,759,298, dated May 20, 1930, Serial No. 303,548, filed September 1, 1928. Application for reissue filed December 26, 1930. Serial No. 504,962.

This invention relates to grease guns, one of the objects being to utilize a pneumatic hammer as a means for expelling grease under impact pressure into a grease cup or the like forming part of a lubricating system.

A still further object is to provide means whereby, when pressure is exerted against the structure for the purpose of forcing its outlet to the grease cup or the like, the supply of grease to the structure will be turned on and air under pressure will also be directed into the air gun, thereby to actuate the mechanism.

Still a further object is to provide a grease gun for discharging a lubricant to a part to be lubricated by exerting upon the lubricant a plurality of rapid, successive and direct impact blows.

A further object is the step in the method of supplying lubricant to a part of a lubricating system by forcing lubricant under increased pressure as a result of a pneumatic hammer action or impact blow on the lubricant.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown. In said drawing—

Figures 1, 2:
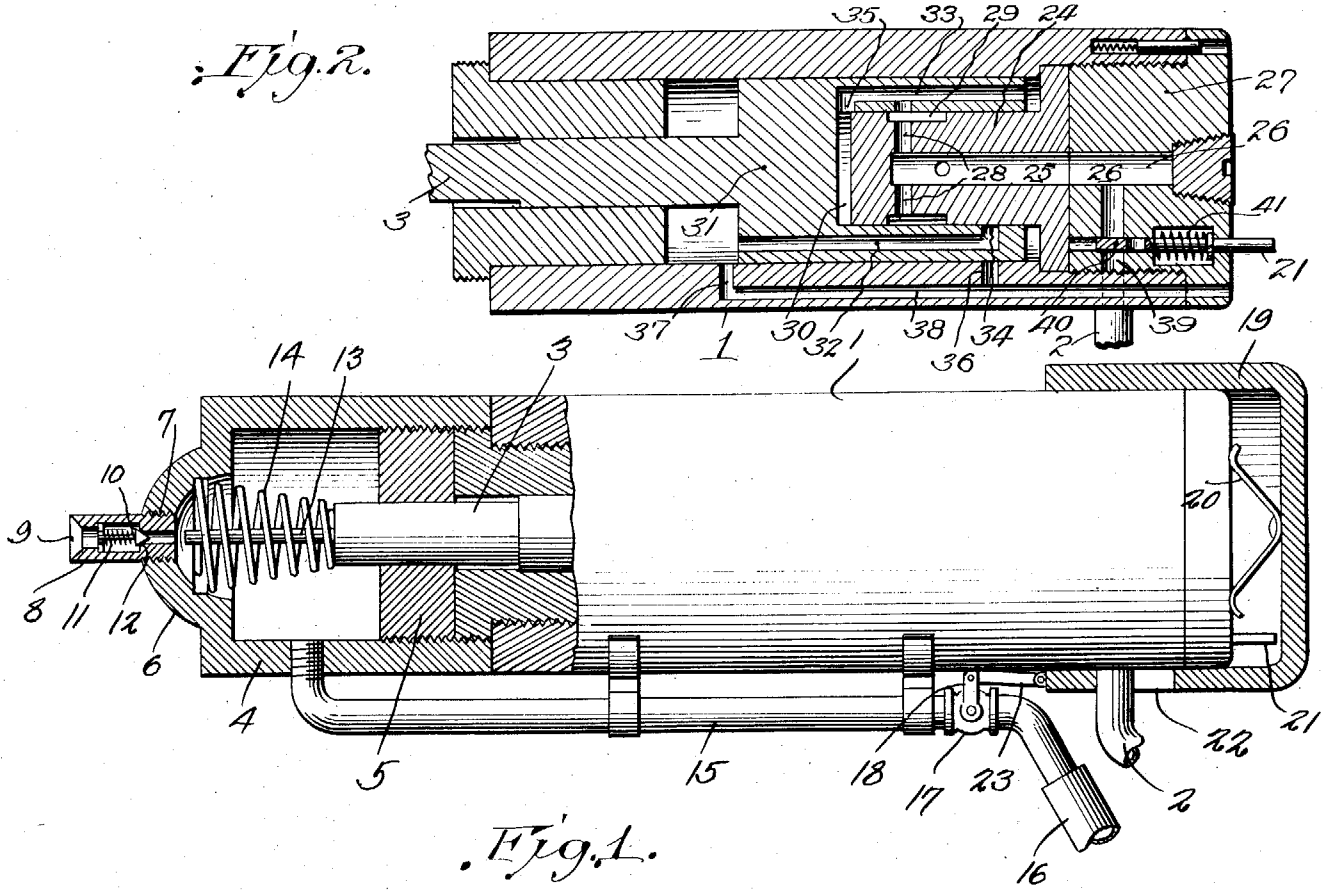
Figure 1 is a view partly in section and partly in elevation.
Figure 2 is a central longitudinal section through the pneumatic hammer part of the grease gun.

Referring to the drawing by characters of reference, 1 designates the cylindrical casing of a pneumatic hammer, the interior mechanism of which is the same as that to be found in devices such as are now commonly used. In such a structure there is located an inlet head 24 having a recess 25 which registers with a central opening 26 in the head 27. Ports 28 open into an annular groove 29. The head 24 extends into a recess 30 formed in a piston 31 and in the piston are channels 32 and 33. Channel 32 opens through one end of the piston and has a port 34 opening into recess 30 while channel 33 opens through the other end of the piston and has a port 35. Exhaust ports 36 and 37 are provided in the casing 1 and open into a channel 38 in the casing 1.

An air supply hose 2 opens into a radial port 39 extending to the recess 6 and this port is normally closed by a slide valve 40 the stem 21 of which projects from the head. A spring 41 can be used for holding the valve normally closed as in the drawings.

When the valve 40 is depressed to open the port 39, the motive fluid passes into recess 25 and ports 28 to groove 29 and from the latter by ports 35 into the channels 33 to the outer end of the casing, and also by ports 35 to the inner end of the recess 30, so that pressure is exerted against the piston 31 to slide the latter from the left to the right. When this takes place, the ports 33 and 35 are cut off from the annular groove 29, while the ports 34 connect with the said groove, and consequently the motive agent now passes from the inlet-head 24 by way of the recess 25, openings 28, groove 29, ports 34, and channels 38 to the hammer end of the piston, so that the piston is moved back to its former position—that is, from the right to the left—as shown. The exhaust-air in the ends of the casing 1 passes alternately through the ports 36, 37 into the channels 38 and from the latter to the outside.

During the reciprocation of the piston the plunger 3 which is carried thereby will also be reciprocated.

For the purpose of converting the pneumatic hammer into a grease gun, a grease container 4 is screwed onto that end of the casing 1 from which the plunger 3 extends and, if desired, a disk 5 may be held within the container 4 for the purpose of reducing the capacity of the container and for guiding the plunger. The free end portion of the container 4 is formed with a concavo-convex extension 6 having an opening 7 into which is screwed one end of a nozzle 8, the other end of which may be flared as shown at 9. If desired, a valve 10 may be mounted in the nozzle, this valve being held by a spring 11 to a seat 12 whereby flow of grease from the container to the nozzle is cut off when the grease is not subjected to the action of the plunger.

Extending from the plunger is an ejecting rod 13 which is in alignment with the passage in the nozzle and is surrounded by a spring 14 one end of which bears against the end of the container 4 while the other end thrusts against the plunger 3. This spring serves to hold the plunger 3 normally pressed away from the free end of the container so that the ejecting rod is normally spaced from the nozzle as shown in the drawing.

A feed pipe 15 is attached to the casing 1 and opens at one end into the container 4. The other end of this pipe is connected to a hose 16 whereby grease is supplied to the pipe 15. The valve 17 is located in the pipe and has a radial arm 18 which, when swung back and forth will open and close the valve.

Slidably mounted on the casing 1 is a cap 19 the end of which is held normally spaced from the casing 1 by a spring 20. The air controlling valve of the pneumatic hammer has a stem 21 projecting from one end of the casing and the spring 20 serves to hold the cap 19 normally out of contact with the stem.

The pipe 2 supplies air to the casing 1 and the valve 21 serves to hold the air supply normally cut off. Cap 19 has a slot 22 through which the pipe 2 extends so that it is thus possible to shift the cap longitudinally of the casing. A link 23 connects the cap to the arm 18 of the valve 17.

When the cap 19 is in its normal position as shown in the drawing the supply of air and grease to the apparatus is cut off. In using the structure the outlet end of the nozzle 8 is placed against the grease cup designed to receive the grease. The operator then pushes against the cap 19 so as to cause it to compress spring 20 and to shift longitudinally of the casing 1. This action will result in the cap pressing against stem 21 so that the air valve will be opened. At the same time link 23 will shift the arm 18 and open the valve 17. Thus the grease will flow into the container 4 while, at the same time, the plunger 3 will be rapidly reciprocated by the air hammer mechanism in the casing, thus exerting hammer effect blows upon the grease. If desired, the grease can be forced under pressure into the container 4. From the container or chamber 4 the grease can be forced to the part to be lubricated by the pneumatic hammer.

Each time the plunger 3 moves toward the nozzle 8 the ejecting rod 13 will enter the nozzle and force thereinto and therefrom an amount of grease, and each time the rod is returned by the spring 14 the grease, under pressure, will rush toward the nozzle where another portion will be expelled by the rod 13. Thus the grease will be positively expelled under heavy pressure or as a result of impact blows directed by the pneumatic hammer device. When the desired amount has been fed to the lubricating system the pressure on the cap 19 is removed and the valves will close so that further operations will cease.

I claim as my invention:—

1. A lubricating attachment for pneumatic hammers, including a grease container for attachment to one end portion of the casing of a pneumatic hammer, thereby to house the projecting operating element of the hammer, a nozzle extending from the container, means for supplying grease to the container, means having slidable engagement with the other end of the pneumatic hammer to control the supply of air to the hammer, and a grease controlling valve actuated by said slidable means.

2. The combination with a pneumatic hammer including a casing, a plunger mounted for rapid reciprocation and extending from the casing at one end, and a valve stem extending from the other end of the casing for controlling the supply of air under pressure to the hammer, of a lubricating attachment including a grease container detachably engaging one end of the casing for the reception of the projecting portion of the plunger, a nozzle extending from said container, said plunger constituting means for intermittently ejecting grease through the nozzle, a pipe for supplying grease to the container, a valve therein, a member slidable on the other end of the casing and shiftable relative to said casing to control the air valve of the hammer, and means actuated by said slidable member for controlling the supply of grease to the container.

3. In combination with means for supplying lubricant to a part to be lubricated, a pneumatically operated impact device for forcing the lubricant from said supplying means.

4. In combination with means for supplying lubricant to a part to be lubricated, an impact device for forcing the lubricant from said supplying means.

5. A lubricating device having a lubricant outlet, impact means for forcing the lubricant through said outlet and means for controlling said impact means.

6. A lubricating device having a lubricant receiving chamber provided with a lubricant inlet and a lubricant outlet, pneumatic means for forcing the lubricant into said chamber and impact means for forcing the lubricant through said outlet.

7. A lubricating device having a chamber therein provided with a lubricant outlet, a plunger adapted to reciprocate in said outlet and pneumatic means for reciprocating said plunger for impacting lubricant through said outlet.

8. In combination with means for supplying lubricant to a part to be lubricated, a pneumatic hammer device for forcing the lubricant to the part to be lubricated by a plurality of impact blows thereon and means controllable by the operator for rendering said pneumatic means operative or inoperative.

9. In a device for supplying lubricant having a lubricant receiving chamber, means for supplying lubricant under an initial pressure to said chamber, impact means for applying additional and increased pressure to the lubricant within said chamber for forcing it therefrom and means for controlling the operation of said impact means.

10. In combination with means for supplying lubricant to a part to be lubricated, pneumatic hammer means for forcing the lubricant from said supplying means by impact blows to the part to be lubricated.

In testimony that I claim the foregoing as my own, I have hereto affixed my signature.

WILLIAM ARCHIE CHAPMAN.